US008543570B1

(12) United States Patent
Cramer

(10) Patent No.: US 8,543,570 B1
(45) Date of Patent: *Sep. 24, 2013

(54) ADAPTIVE USER INTERFACE FOR REAL-TIME SEARCH RELEVANCE FEEDBACK

(75) Inventor: Mark D. Cramer, San Francisco, CA (US)

(73) Assignee: Surf Canyon Incorporated, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,433

(22) Filed: Jan. 20, 2012

Related U.S. Application Data

(63) Continuation of application No. 12/482,389, filed on Jun. 10, 2009, now Pat. No. 8,117,197.

(60) Provisional application No. 61/131,498, filed on Jun. 10, 2008.

(51) Int. Cl.
*G06F 17/30* (2006.01)

(52) U.S. Cl.
USPC ...... 707/723; 707/805; 705/14.26; 705/14.43

(58) Field of Classification Search
USPC .............. 707/737, 736, 723, 708, 707, 705, 707/706, 730, 770, 731, 722, 999.001, E17.108, 707/E17.014, E17.032, 999.003, 805, 735, 707/747; 705/14, 26, 14.43, 14.54
See application file for complete search history.

(56) References Cited

U.S. PATENT DOCUMENTS

| | | | |
|---|---|---|---|
| 5,806,077 A | 9/1998 | Wecker | |
| 5,890,152 A | 3/1999 | Rapaport et al. | |
| 5,946,678 A | 8/1999 | Aalbersberg | |
| 6,134,532 A * | 10/2000 | Lazarus et al. | 705/14.25 |
| 6,370,526 B1 | 4/2002 | Agrawal et al. | |
| 6,591,261 B1 | 7/2003 | Arthurs | |
| 6,691,106 B1 | 2/2004 | Sathyanarayan | |
| 6,738,764 B2 | 5/2004 | Mao et al. | |
| 6,829,599 B2 | 12/2004 | Chidlovskii | |

(Continued)

OTHER PUBLICATIONS

Taher H. Haveliwala—"Topic-Sensitive PageRank: A Context-Sensitive Ranking Algorithm for Web Search"—IEEE Transactions on Knowledge and Data Engineering, vol. 15, No. 4, Jul./Aug. 2003 (pp. 784-796).*

(Continued)

*Primary Examiner* — John E Breene
*Assistant Examiner* — Anh Ly
(74) *Attorney, Agent, or Firm* — Kilpatrick Townsend & Stockton LLP

(57) ABSTRACT

A method and apparatus for dynamically adjusting the user interface of a search engine in order to effectively communicate the improved relevancy achieved through real-time implicit re-ranking of search results is described. Real-time implicit re-ranking occurs without delay after every user action as the search is being conducted, so finding methods of immediately altering the search page without disrupting the user experience is important. Graphical icons next to search results are employed to enable generating and removing re-ranked results, referred to as "recommended" search results. Clusters based on the real-time user model are also displayed to facilitate query reformulations. Sponsored links are selected using the real-time user model along with a combination of RPC and CTR information and are displayed in a manner similar to the organic results, or used to replace the initial sponsored links altogether.

13 Claims, 7 Drawing Sheets

Diagram of a system incorporating the present invention

(56) References Cited

U.S. PATENT DOCUMENTS

| | | | |
|---|---|---|---|
| 6,981,040 B1* | 12/2005 | Konig et al. | 707/E17.109 |
| 7,080,064 B2* | 7/2006 | Sundaresan | 707/999.003 |
| 7,437,370 B1 | 10/2008 | Ershov | |
| 7,444,327 B2 | 10/2008 | Watson et al. | |
| 7,475,072 B1 | 1/2009 | Ershov | |
| 7,496,548 B1 | 2/2009 | Ershov | |
| 7,599,918 B2* | 10/2009 | Shen et al. | 707/999.003 |
| 8,095,582 B2* | 1/2012 | Cramer | 707/705 |
| 8,117,187 B2* | 2/2012 | Mostl | 707/716 |
| 8,290,810 B2* | 10/2012 | Ramer et al. | 705/7.32 |
| 2002/0107776 A1 | 8/2002 | Bove et al. | |
| 2003/0014399 A1 | 1/2003 | Hansen et al. | |
| 2003/0088463 A1 | 5/2003 | Kanevsky et al. | |
| 2003/0135490 A1 | 7/2003 | Barrett et al. | |
| 2003/0144994 A1 | 7/2003 | Wen et al. | |
| 2003/0195877 A1 | 10/2003 | Ford et al. | |
| 2004/0111678 A1* | 6/2004 | Hara et al. | 707/3 |
| 2005/0060311 A1 | 3/2005 | Tong et al. | |
| 2005/0071328 A1 | 3/2005 | Lawrence | |
| 2005/0102282 A1 | 5/2005 | Linden | |
| 2005/0165781 A1 | 7/2005 | Kraft et al. | |
| 2005/0192863 A1 | 9/2005 | Mohan | |
| 2005/0234952 A1 | 10/2005 | Zeng et al. | |
| 2006/0064411 A1* | 3/2006 | Gross et al. | 707/3 |
| 2006/0136589 A1 | 6/2006 | Konig et al. | |
| 2007/0022111 A1 | 1/2007 | Salam et al. | |
| 2007/0061487 A1 | 3/2007 | Moore et al. | |
| 2007/0179847 A1* | 8/2007 | Jain | 705/14 |
| 2007/0260597 A1* | 11/2007 | Cramer | 707/5 |
| 2008/0114751 A1* | 5/2008 | Cramer et al. | 707/5 |
| 2008/0120289 A1 | 5/2008 | Golan et al. | |
| 2008/0222142 A1 | 9/2008 | O'Donnell | |
| 2008/0244428 A1 | 10/2008 | Fain | |
| 2008/0250026 A1* | 10/2008 | Linden et al. | 707/10 |
| 2008/0295006 A1 | 11/2008 | LuVogt et al. | |
| 2009/0063475 A1* | 3/2009 | Pendse | 707/5 |
| 2009/0164448 A1 | 6/2009 | Curtis | |
| 2009/0276368 A1 | 11/2009 | Martin et al. | |
| 2009/0282021 A1 | 11/2009 | Bennett | |
| 2009/0327267 A1* | 12/2009 | Wong et al. | 707/5 |
| 2010/0169297 A1 | 7/2010 | Haveliwala et al. | |
| 2012/0078710 A1* | 3/2012 | Cramer | 705/14.43 |

OTHER PUBLICATIONS

Diane Kelly—"Implicit Feedback: Using Behavior to Infer Relevance"—Amanda Spink and Charles Cole (eds.), New Directions in Cognitive Information Retrieval., vol. 19, 2005, (pp. 169-186).*

Shen, Xuehua et al.; "Implicit User Modeling for Personalized Search"; 2005, Department of Computer Science, University of Illinois at Urbana-Champaign, 8 pages.

Agichtein et al.; "Improving Web search Ranking by Incorporating User Behavior Information"; 2006, *ACM*, 8 pages.

Agichtein et al., "Learning User Interaction Models for Predicting Web search Reult Preferences"; 2006, *Microsoft Research*, 8 pages.

Claypool et al.; "Inferring User Interest"; 2001, *IEEE*, 8 pages.

Fox et al.; "Evaluating Implicit Measures to Improve Web Search"; 2005, *ACM*, 22 pages.

Goecks et al.; "Learning Users' Interests by Unobtrusively Observing Their Normal Behavior"; 1999, *University of Wisconsin*, 4 pages.

Joachims et al.; "Accurately Interpreting Clickthrough Data as Implicit Feedback"; 2005, *ACM*, 8 pages.

* cited by examiner

Diagram of a system incorporating the present invention

Diagram of one embodiment of the initial search results

Diagram of one embodiment of the re-ranked search results

Diagram of one embodiment of re-ranked search results presented as indented "recommendations"

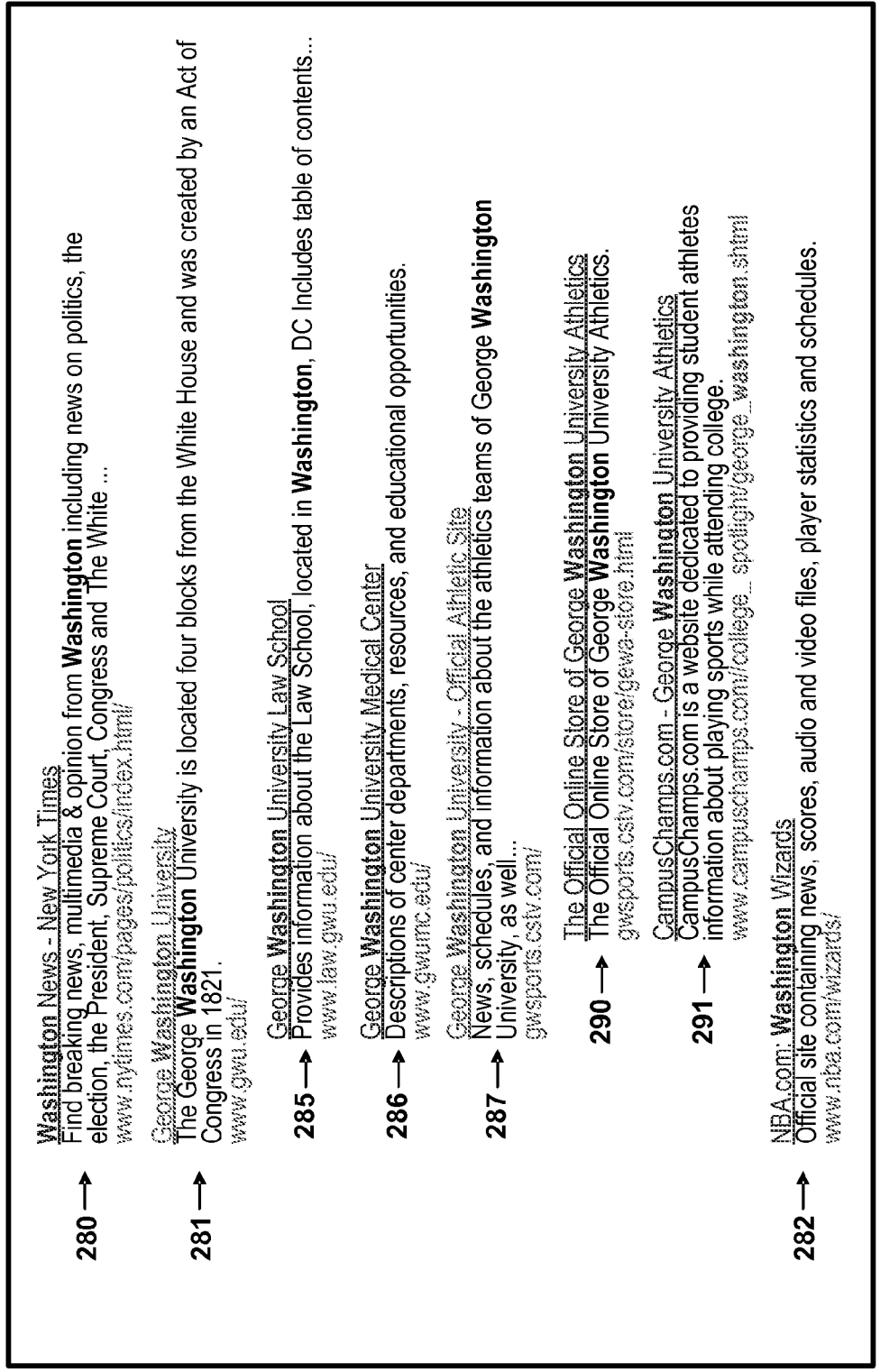

Diagram of one embodiment of adaptive UI tools added to the search results page

ADAPTIVE USER INTERFACE FOR REAL-TIME SEARCH RELEVANCE FEEDBACK

CROSS-REFERENCES TO RELATED APPLICATIONS

This application is a continuation of U.S. patent application Ser. No. 12/482,389, now U.S. Pat. No. 8,117,197 B1, filed Jun. 10, 2009, entitled "Adaptive User Interface for Real-Time Relevance Feedback", which claims the benefit of U.S. Provisional Patent Application No. 61/131,498 filed Jun. 10, 2008, entitled "Search result relevancy using real-time implicit relevance feedback", which is hereby incorporated by reference in its entirety. Related applications are U.S. patent application Ser. No. 11/510,524 filed Aug. 25, 2006, (abandoned) entitled "Dynamic Search Engine Results Employing User Behavior" and U.S. patent application Ser. No. 11/743,076 filed May 1, 2007, entitled "Real Time Implicit User Modeling for Personalized Search", the disclosures of which are hereby incorporated herein by reference.

BACKGROUND OF THE INVENTION

The present invention relates to search engines which monitor real-time user behavior in order to improve relevance by immediately re-ranking results in response to user actions.

Information Retrieval (IR) systems in general, and search engines in particular, are designed to assist users in locating and identifying documents of interest based on a variety of input regarding the user's information need. This need is most normally received by asking the user to input a query, typically expressed as a set of keywords and sometimes including various Boolean operators. The understanding of the user's intent can then be modified or refined based on other user inputs, both explicit and implicit. The IR system will then comb the universe of available documents for possible matches which, based on any number of different relevancy algorithms, are presented to the user in a descending order of probability of interest. In other words, those documents with the highest probability of being relevant to the user are typically presented first. The objective is to quickly point the user toward documents with the greatest likelihood of satisfying the information need.

Information retrieval on very large data communication networks that contain an enormous amount of information, such as the internet, is particularly difficult given the sizable sets of potentially relevant documents. It is not uncommon for queries on the general internet to return hundreds of thousands, if not millions, of results. Optimally ranking these results based on inherently ambiguous user input, even when taking additional information regarding the user or other searchers into account, is extremely challenging.

IR systems and search engines have thus employed many strategies for combating this issue, most of which seek to achieve a better understanding of the user's information need. Some explicitly request additional information concerning intent, such as directly asking the user to respond to questions regarding both short- and long-terms interests as well as proposing clusters (e.g., a group of key words or categories), drill-downs or reformulations based on the user's query. Others rely on implicit signals derived from user behavior in order to better divine intent.

While the objective of all of these strategies is to produce an optimally ranked set of results based on the user's query and the corpus of user, documents and other information available prior to the user submitting the query, one technique of particular interest involves using real-time user behavior signals to disambiguate intent after the result set has been produced and then exploiting that information to immediately re-rank the results following each user action. (This is described in U.S. patent application Ser. Nos. 11/510,524 entitled "Dynamic search engines results employing user behavior" and 11/743,076 entitled "Real time implicit user modeling for personalized search.") While the other strategies harness various types of information, both implicit and explicit, to produce a static and frequently sub-optimally ranked set of documents, the results with real-time re-ranking are dynamic as each new user input immediately generates an improved ranking and modified result set.

As an example, a user query for "dolphins" is inherently ambiguous as it is unclear whether the individual's intent refers to the mammal or the football team. By observing the past search behavior of the individual, as well as those of other searchers, many IR strategies will attempt to divine which context has the greater likelihood of satisfying this particular user's information need, at the particular point in time, but it's virtually impossible to know with certainty and so the result set will typically contain a mix of both. Once the user actually selects a result from one context or the other, however, the degree to which the user's intent can be inferred is increased dramatically and the result set can be optimized on the fly by immediately re-ranking the documents. For example, should the user select a result related to the Miami Dolphins football team, documents related to football are "promoted" while simultaneously those related to the mammal are "suppressed."

While a static result set is easily depicted as a list of documents in something close to descending order of probabilistic relevance, presenting dynamic results poses challenges for the user interface (UI). As the re-ranking of results continuously produces an optimally superior order of documents, it is important for any distraction created by the movement of documents to not impair the advantage of the heightened relevancy.

There is therefore a need to develop a UI capable of delivering the benefits of real-time re-ranking while being as unobtrusive as possible to the user's search experience.

SUMMARY OF THE INVENTION

The present invention provides a system and methods for dynamically altering the UI of an IR system to present the fluid nature of search results as they are re-ranked in real time.

In one embodiment, the adaptive UI is run as a software application between a user and a standard third-party search engine or multiple third-party search engines. This software application can run on the user's computer, a central server, or both. In another embodiment the software for the UI is built into the underlying IR system and may run on the same server as the IR system or a separate server.

In one embodiment, every time a new ranking is produced the search results are immediately redisplayed in their new order. In another embodiment, rather than moving around results that have already been displayed, only the unseen results are re-ranked with the top unseen documents, after the re-ranking, being inserted on the search results page as recommended search results. In another embodiment, such recommendations are nested to several levels with each successive user action bringing forward from subsequent results pages more re-ranked documents. Each set of recommendations may be preceded by some explanatory text or some other design device, or displayed on a different area of the page, to set them apart from the documents that were previously on the results page.

In one embodiment the initial position of each document is indicated by some text or graphical element. For example, a re-ranked result on page 1 that was initially on page 2 might be followed by the text "from page 2."

In one embodiment each result is accompanied by a graphical element or link enabling the immediate re-ranking of documents and display of recommended search results. Clicking a graphical element will behave similarly as if the user had selected the particular document and then returned to the result set. These graphical elements may also accompany each recommended search result and operate in a similar manner. In another embodiment, clicking the graphical element for a document that already has recommendations will cause the recommendations to be removed from the page, along with any associated nested recommendations. Subsequently clicking the same graphical element will alternately display and remove the set of recommendations and any associated nested recommendations.

In one embodiment, clusters or query reformulation suggestions are presented next to each set of recommended documents. Unlike traditional clusters, however, these clusters are refined and selected based on the current real-time user model. Rather than presenting a set of clusters or query reformulation suggestions based on the user's query or the entire document set, the present invention can produce more highly targeted clusters to facilitate the process of moving forward.

In one embodiment, the next page of results, prior to being displayed to the user, is completely re-ranked at the moment the user clicks "next" or "more results." Once these re-ranked results are displayed they become seen and so re-ranking and display of recommendations proceeds as it did on the previous page.

Sponsored links may also be re-ranked or updated based on the real-time model of user intent. In one embodiment, the real-time user model is used to select more appropriate advertisements from the set of advertisements associated with the user's query. In another embodiment, the real-time user model is used to modify the user's query in order to find additional advertisements more precisely related to the user's intent.

In one embodiment, whenever the real-time user model is updated the old advertisements are removed from the page and replaced with new advertisements. In another embodiment, the advertisements operate similar to the organic results with recommended sponsored links being inserted under selected sponsored links. In another embodiment, sponsored links on subsequent pages of results are selected based on the current real-time user model.

The outcome is a dynamic UI that adapts to the real-time user model in order to display the most relevant search results and advertisements in a manner as unobtrusive to the user experience as possible.

BRIEF DESCRIPTION OF THE DRAWINGS

FIG. 2E is a diagram of one embodiment of re-ranked search results presented as nested "recommendations"

DETAILED DESCRIPTION OF THE INVENTION

Figure 1:
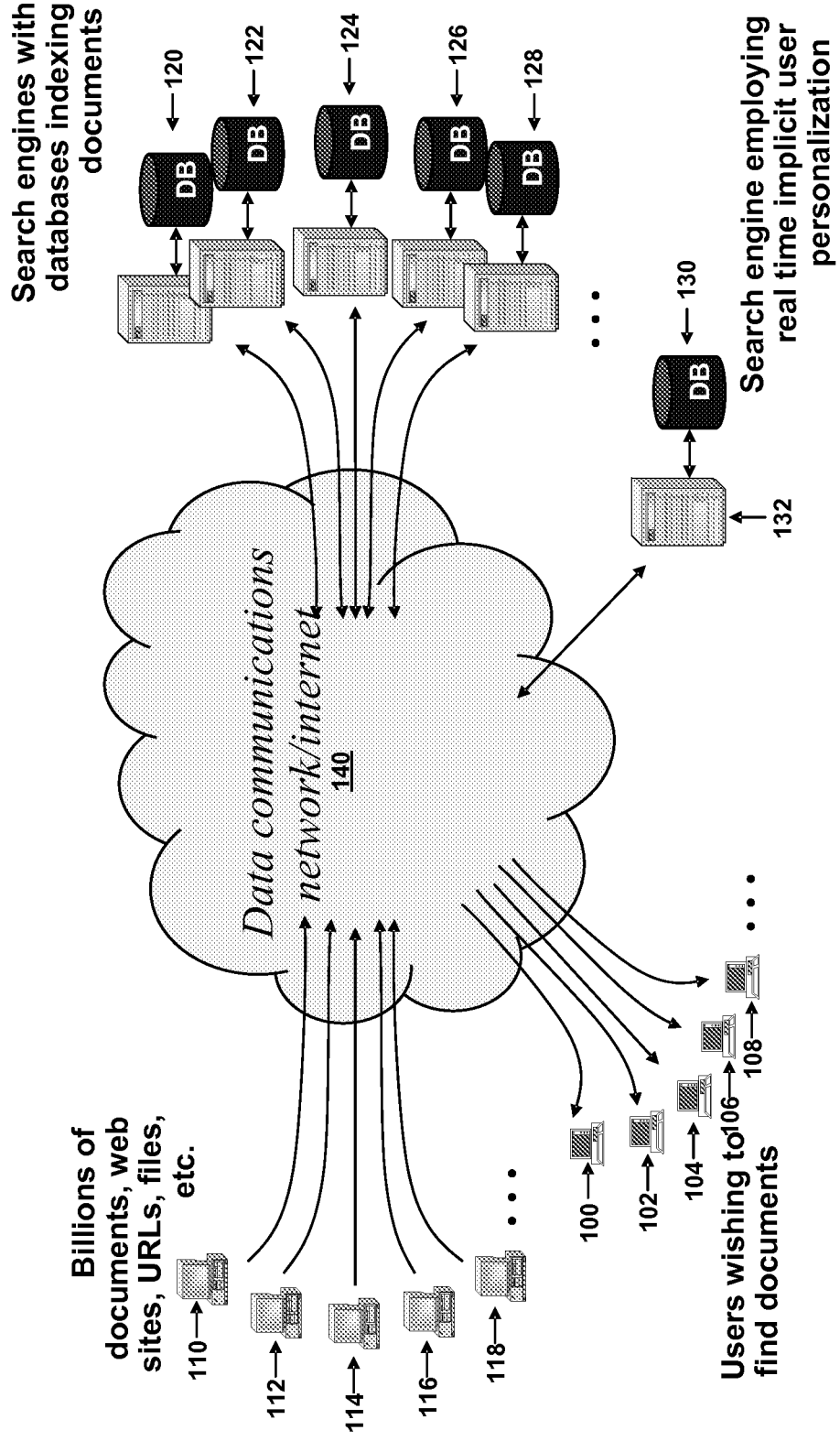
FIG. 1 is a diagram of one embodiment of a system incorporating the present invention.

The preferred embodiment of the present invention operates on the internet, and more specifically the World Wide Web. The invention, however, is not limited to the internet, the World Wide Web or any other particular network architecture, software or hardware which may be described herein. The invention is appropriate for any other network architectures, hardware and software. Furthermore, while the following description relates to an embodiment utilizing the internet and related protocols, other networks and protocols, for example, for use with interactive TVs, cell phones, personal digital assistants and the like, can be used as well.

The functions described herein are performed by programs including executable code or instructions running on one or more general-purpose computers. The functions described herein, however, can also be implemented using special purpose computers, state machines and/or hardwired electronic circuits. The example processes described herein do not necessarily have to be performed in the described sequence and not all states have to be reached or performed.

As used herein, the term "website" refers to a collection of content. Website content is often transmitted to users via one or more servers that implement basic internet standards. "Website" is not intended to imply a single geographic or physical location but also includes multiple geographically distributed servers that are interconnected via one or more communications systems.

As used herein, the term "document" is defined broadly and includes any type of content, data or information contained in computer files and websites. Content stored by servers and/or transmitted via the communications networks and systems described herein may be stored as a single document, a collection of documents or even a portion of a document. The term "document" is not limited to computer files containing text but also includes files containing graphics, audio, video and other multimedia data. Documents and/or portions of documents may be stored on one or more servers.

As used herein, the term "click" or "click-through" is defined broadly and refers to clicking on, or hovering over, a hyperlink included within search result listings to view an underlying document or website. The term "clicking on" a link or button, or pressing a key to provide a command or make a selection, may also refer to using other input techniques such as voice input, pen input, mousing over or hovering over an input area or the like.

The dynamic UI of the present invention is designed to efficiently communicate the benefits of enhanced relevancy obtained through immediately re-ranking of search results in response to user actions. In order to appreciate the benefits of real-time re-ranking, the display of search results should be updated each time the real-time user model produces a new ranking of search results. In the preferred embodiment, the display of search results is immediately updated every time a re-ranking occurs.

FIG. 1 is a high-level illustration of a preferred embodiment of a system incorporating the present invention. Documents on servers or computers 110-118, on a data communication network 140, such as the internet, are scanned and indexed by search engines on computers and associated databases 120-128. On the internet there are currently billions of documents available, with more being added daily. Google, Yahoo! and Bing are examples of popular internet search engines, but most any web site that enables users to search for documents on a data communications network and retrieve relevant results can be considered a search engine. Users on computers or terminals 100-108 seeking information can connect with the search engine of their choice, enter keywords related to their searches, and then retrieve lists of matched documents, normally sorted and ranked by an algorithm that places the ones with the highest probability of being relevant to the user's query at the top. The real-time re-ranking engine provides a server 132 and database 130 which plug into the data communications network and then uses the behavior of current users to alter the results provided by one, if not several, of the other search engines. An embodiment of the present invention resides on server 132 with the re-ranking engine.

The description of this system will focus on a website that takes results from other search engines that reside on the internet, however, other embodiments of the system would involve incorporating the re-ranking engine and present invention directly into one of the other search engines 120-128. Rather than collecting the initial search results via a data communications network, the system can gather the results directly from a search engine.

One embodiment of the invention would involve software, which could be made available for download, which resides on users' computers or terminals 100-108. Rather than going to the website of the invention, users will now go directly to a search engine of choice and the process of using user modeling to immediately alter search results will be performed by the software located on the users' computers. The adaptive UI can then be applied on top of the user's search engine within the user's computer.

Figure 2A:
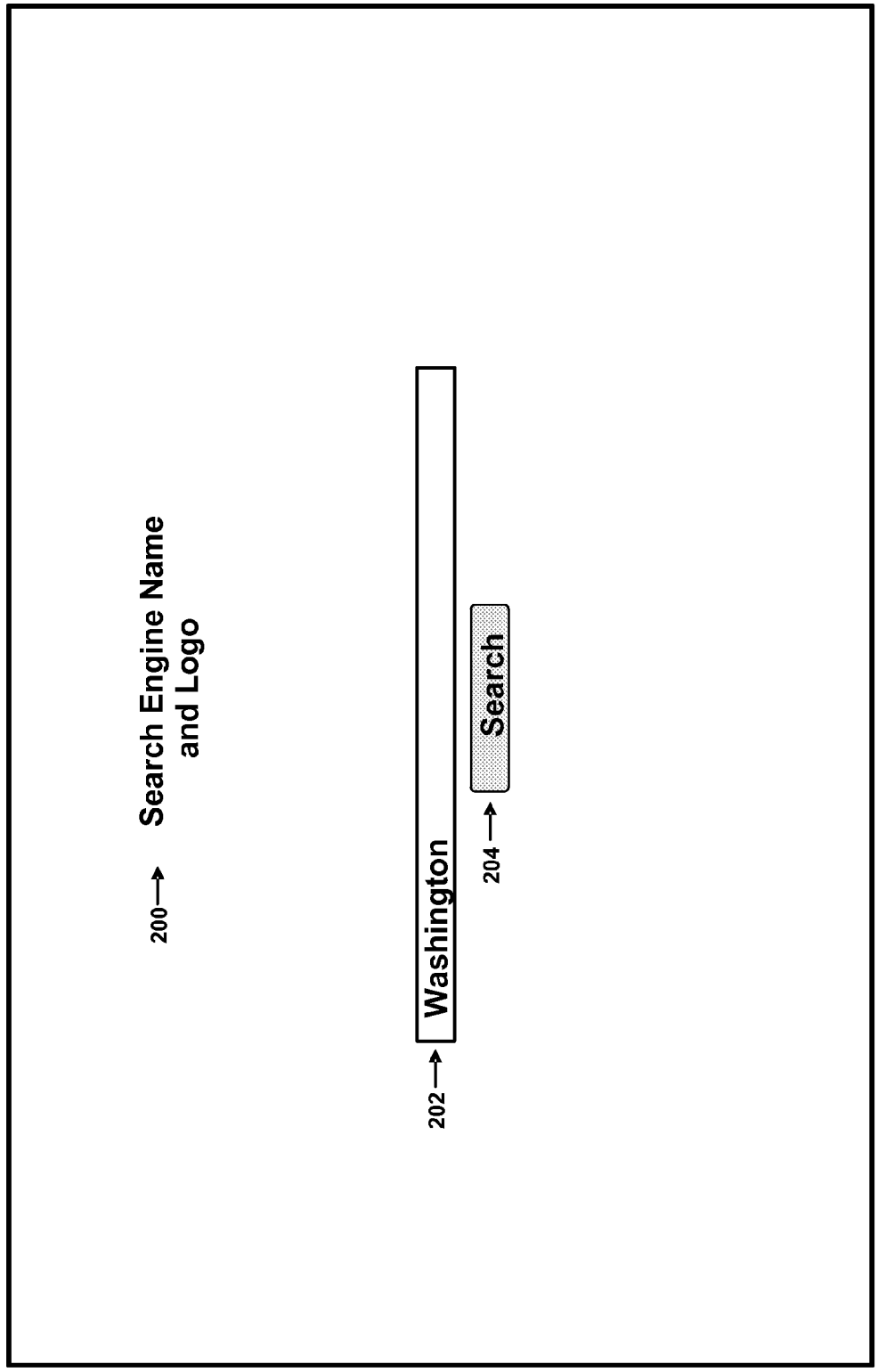
FIG. 2A is a diagram of one embodiment of the home page.

FIG. 2A is a diagram of a home page of a search engine. While other information and links can be present, the principal purpose of the home page is to enable the user to enter a query consisting of a keyword or set of keywords 202 representing the user's information need before clicking on a button 204 to request that the search engine retrieve the results.

Figure 2B:
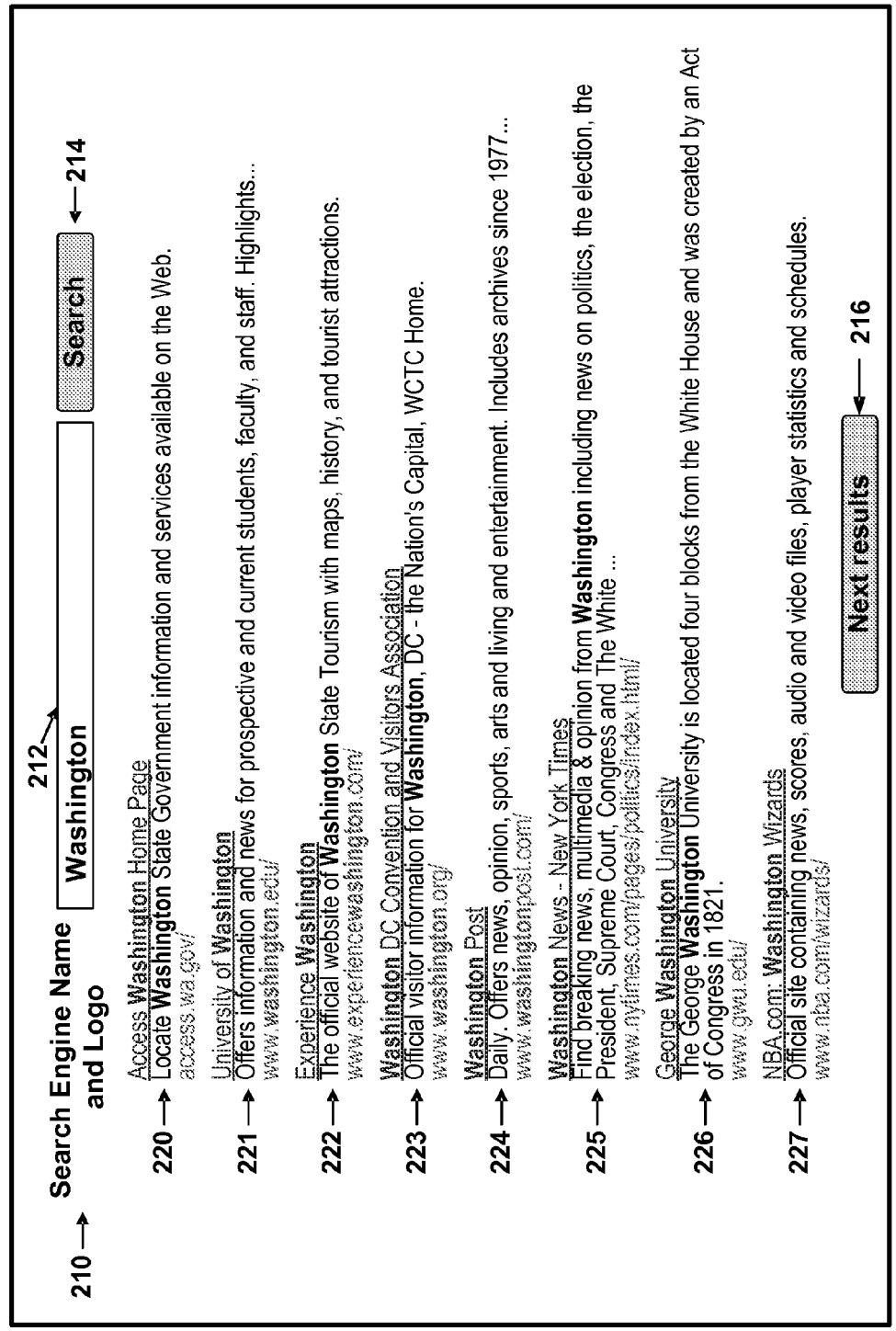
FIG. 2B is a diagram of one embodiment of the initial search results.

FIG. 2B is a diagram of an example of a search results page depicting what the initial search results for the keyword "Washington" might look like. Upon receiving a query 212 from a user, expressed as a keyword or set of keywords, the search engine produces a set of results 220-227. Each result is normally comprised of a title, snippet and the Uniform Resource Locater (URL) of the document, the combination of which can be described as the summary. Search engines may also include additional information next to each result, such as images or expanded snippets. Since the number of matched documents rarely fits on a single page, buttons, such as a next results button 216, are typically available to enable users to navigate to subsequent pages of results and then back to previous pages of results. It should also be noted that a search engine may offer supplemental information on the search results page, as is often the case, such as related popular queries, suggested spellings or links to maps and stock quotes.

Figure 2C:
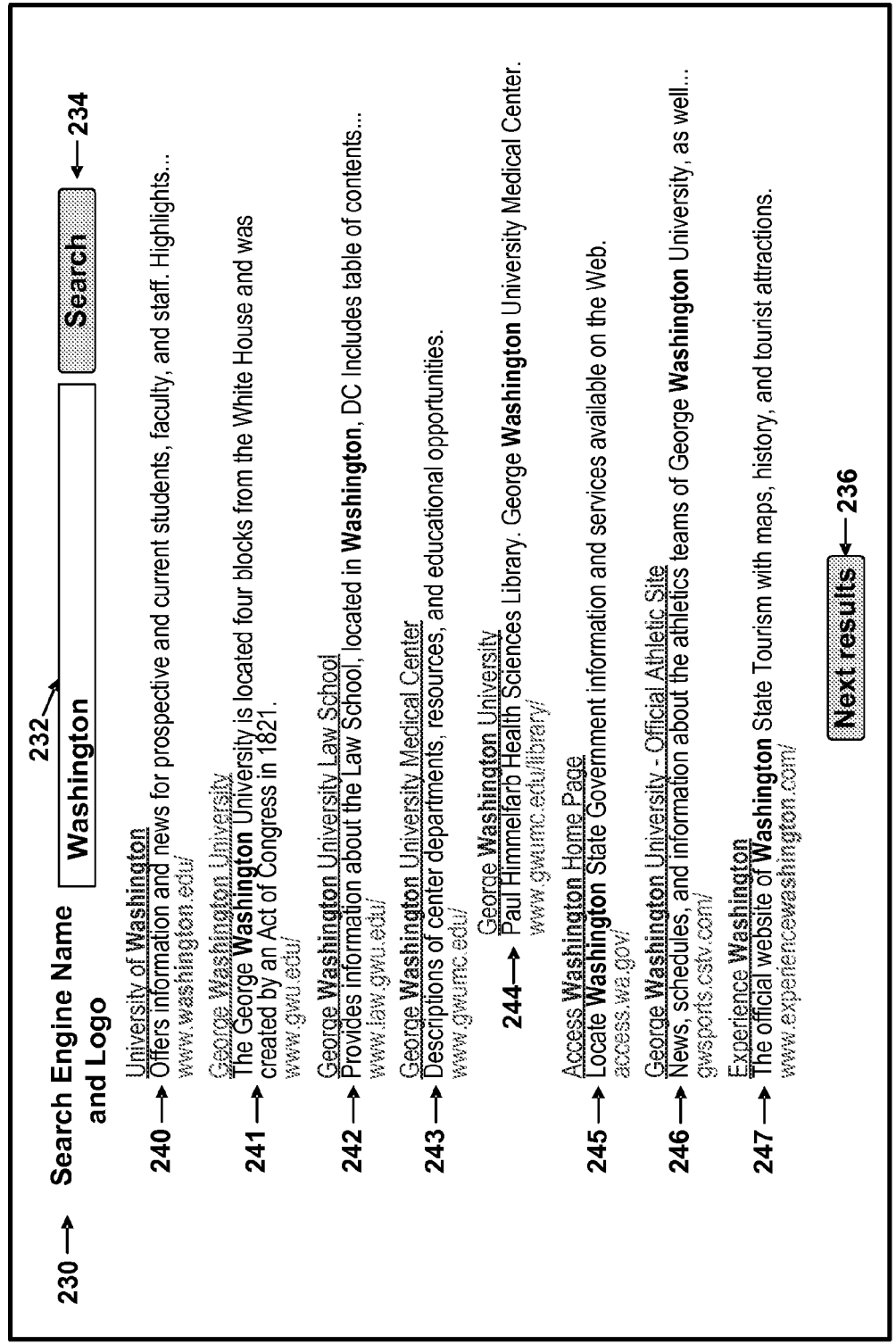
FIG. 2C is a diagram of one embodiment of the re-ranked search results.

FIG. 2C is a diagram of an example of how the first modified results might look after the user clicks on the document "George Washington University" 226 from the initial results as depicted in FIG. 2B and then, after viewing the document, returns to the search results page. The set of matched documents remains the same, yet their order has changed based on the intelligence gathered as a consequence of the user's click on the document "George Washington University" 226. The re-ranking engine has deduced that the user is most likely interested in universities containing the word "Washington" as opposed to George Washington the man or Washington the city or state. As a result, the "Access Washington Home Page" document 220, which was initially at the top of the list, has fallen to the sixth position 245 because the system has deemed, based on the behavior of the user, that the probability of this document being relevant to the user has declined. On the other hand, the "University of Washington" document 221, which was initially in the second position, has now moved to the top 240 because the system has deemed, again based on the behavior of the user, that the relevance of this document has increased. This process continues, for all practical purposes, for every document returned in the set of search results.

Figure 2D:
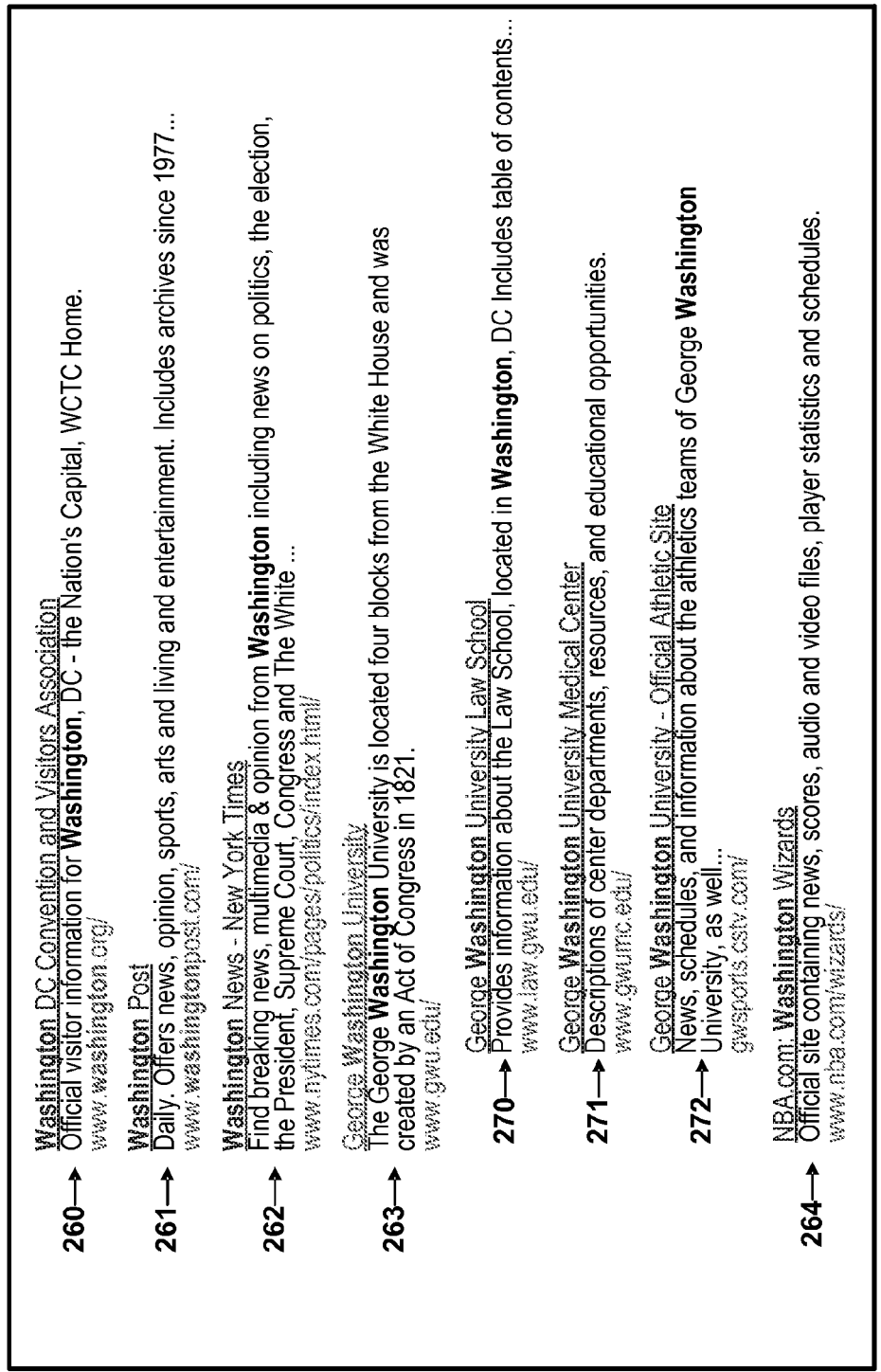
FIG. 2D is a diagram of one embodiment of re-ranked search results presented as indented "recommendations"

FIG. 2D represents another embodiment of the invention where instead of immediately altering the positions of all of the documents, the documents that have already been seen 260-264 remain "static," while re-ranked results from subsequent pages are pulled forward 270-272 and indented as "recommendations." In this example, upon the user selecting the document "George Washington University" 263, the re-ranking engine immediately adjusts the position of all the documents in the result set that have not yet been seen by the user and then the adaptive UI pulls forward three to present to the user as recommendations. Should the user return to the search result page by clicking "back" on the web browser, or select the document without leaving the search result page by doing something such as a Ctrl-click on the result link, the recommended documents will immediately be presented.

In this example, three documents are pulled forward as recommendations, however, any number of documents may be selected, including zero. In another embodiment of the invention, the number of documents pulled forward as recommendations is a function of the quality of results that are already on the page, as determined by the re-ranking engine. For example, if three documents are selected as candidates for recommendations yet the re-ranking engine determines that one of those is inferior to a result that is already displayed on the page, the adaptive UI will only bring forward the other two as recommendations.

Table I is an illustration of how the number of recommended results for a given user action can be made to vary. Assume that the system is configured to bring forward a maximum number of three recommended results after the selection of a document. Documents A through T are ranked from 1 to 20, with the first ten results (documents A through J) being on the first page of search results. At the moment the user selects Document E, which was initially ranked #5, the re-ranking engine calculates the new ranks. Since documents A through J have already been seen by the user, at the moment the user returns to the search results page these documents will remain present in the same order, however, the adaptive UI will bring forward up to three recommended search results from subsequent pages which, in this example, is only the second page. The new ranking indicates that documents M and Q are relevant to the user based on the real-time user model, so they are brought to the first page of results as recommendations. Document T, however, is not since there are still documents on the first page of results (documents H and I) that are more relevant, based on the new ranking, than document T.

TABLE I

Example of using recommended result relative quality in the determination of the number of recommended search results to display

| Initial Rank | New Rank | Document | Notes |
|---|---|---|---|
| 1 | 13 | Document A | Skipped |
| 2 | 16 | Document B | Skipped |
| 3 | 10 | Document C | Skipped |
| 4 | 7 | Document D | Skipped |
| 5 | 1 | Document E | Selected document |
| 6 | 8 | Document F | |
| 7 | 18 | Document G | |
| 8 | 4 | Document H | |
| 9 | 5 | Document I | |
| 10 | 20 | Document J | |
| 11 | 12 | Document K | |
| 12 | 11 | Document L | |
| 13 | 2 | Document M | $1^{st}$ recommended result |
| 14 | 14 | Document N | |
| 15 | 15 | Document O | |
| 16 | 9 | Document P | |
| 17 | 3 | Document Q | $2^{nd}$ recommended result |
| 18 | 19 | Document R | |
| 19 | 17 | Document S | |
| 20 | 6 | Document T | Not brought forward |

In some situations a result may be brought forward as a recommended result even if there is a more highly ranked document already on the page. For example, using Table I, should document H have had a new rank of #3 and document Q have had a new rank of #4, the adaptive UI could have still brought forward document Q because, subsequent to the re-ranking, the three most relevant results, not including the selected document, would have been, respectively, documents M, H (already on the first page) and Q. In another embodiment of the invention, the skipped results are not considered when determining how many results to bring forward as, in spite of the fact they might have a high relevance as determined by the real-time user model, they have already been viewed and passed over by the user.

In one embodiment of the invention the top re-ranked documents are pulled forward to the current search results page as recommendations, however, in another embodiment the adaptive UI modifies this slightly by selecting a diverse set of re-ranked documents in order to maximize the likelihood of presenting something relevant to the user. Should the re-ranking engine determine that there are multiple possible sub-contexts for the user's intent, represented as subordinate keywords with significant positive weights or multiple clusters associated with the selected documents, the invention may pull forward the top re-ranked document from each of these sub-contexts (the determination, weighting and use of subordinate keywords is described in detail in the Related Applications described and incorporated by reference above). For example, in FIG. 2D at the moment the user selects the result "George Washington University" 263, the real-time user model could produce three recommendations 270-272 using the highly-weighted subordinate keywords "George" and "University" while attempting to have each recommendation correspond to different sub-context, such as "law school," "medical center" and "athletics." Even if the top three re-ranked results were all related to the George Washington University Law School, presented results from other sub-contexts enhances the chances that at least one of the recommended search results will correspond to the user's information need.

The benefit of maintaining the results that have already been viewed by the user, in the original order, and then bringing forward re-ranked documents as recommended search results, is that the experience is less jarring to the user. Removing results that have already been seen, even if they haven't been selected, or changing the order of results that have already been displayed on the search results page can be confusing and potentially disconcerting to the user. Before selecting a document, users will often retain a visual image of the search results page, which they expect to remain somewhat consistent upon returning to the search results page. By maintaining the relative positions of the documents that have already been seen while inserting re-ranked documents, users can benefit from the improved relevance without having their search experience excessively disrupted.

Subsequent pages of results are calculated using the real-time user model at the moment the user selects "Next" or "More results." All of the documents that have not yet been displayed to the user, either as the original set of results or recommended search results, will be re-ranked before the adaptive UI presents the top re-ranked documents as the next page of results. Once this new page is displayed, however, those documents are considered "seen" and the re-ranking process, with new documents brought forward as recommendations following each user action, proceeds as described above. In another embodiment, much as recommendations may be selected to present a diversity of sub-contexts to the user, as described above, re-ranked documents for subsequent pages of results may also be chosen to present a diversity of sub-contexts to the user.

FIG. 2E represents one embodiment of the invention where re-ranked documents, presented as recommended search results, are nested. In this example, after selecting the document "George Washington University" 281 and being presented with three recommendations 285-287, the user proceeds by selecting the document "George Washington University—Official Athletic Site" 287 and is immediately presented with two additional recommendations 290-291. These two new recommendations are based on the real-time user model of inferred intent built from the knowledge that the user has selected "George Washington University" and "George Washington University—Official Athletic Site" as well as skipped over a number of other documents as well as some recommended search results. In this particular example it may be inferred that, while the user's query was for "Washington," the intent is more specific to athletic programs at the University of Washington. As a consequence, the two nested recommended search results pertain to such. In one embodiment, the number of recommended result objects in each nest level is enough to provide the user a selection, but not so many as to affect the perception that the user is looking at the same page. In one embodiment, between 3 and 5 objects are provided in each nest level.

Should the user then move forward by selecting the document "George Washington University Law School" 285, the real-time user model will be employed to determine a new ranking for all of the documents and the adaptive UI will insert any new recommended results directly under the document the was just selected 285. The real-time user model will take into account all of the user's actions during the current information session and, as such, the recommended results produced will be based on all the previously selected and skipped documents.

In one embodiment of the invention, a decay is used to adjust the weights of positive and negative subordinate keywords as the search is progressing. After each user action, just prior to updating the real-time user model, all of the subordinate keywords may be multiplied by some scaling factor, such as 90%. This will have the benefit of providing slightly more weight to the most recent user actions, which, during relatively long information sessions, will have the benefit of producing new rankings that compensate for any slight changes or drifts in user intent. Long information sessions often involve a learning process on the part of the user which could have an impact on the real-time model of inferred intent. An embodiment of the invention involves compiling information to infer user intent based on the titles and snippets of the results on the search page of said clicked and said skipped documents. Also, an embodiment of the invention involves compiling further information to infer user intent based on the content of said document the user clicks on and said documents said user skips.

In one embodiment of the invention, the adaptive UI offers a control, in the form of a link or a button, to enable the user to clear or reset the real-time user model and recommence with the query. This could be particularly useful should the user experience and recognize a significant shift in information need while the search is taking place. Since the real-time user model incorporates all of the user's previous actions in the information session, a significant shift in intent could cause the re-ranking engine to produce results that are potentially no longer relevant. Even if the embodiment includes a "decay" as described above, a control somewhere on the search results page, such as a link called "reset recommendations" or "clear user model," could be beneficial to the user in this circumstance.

Figure 3:
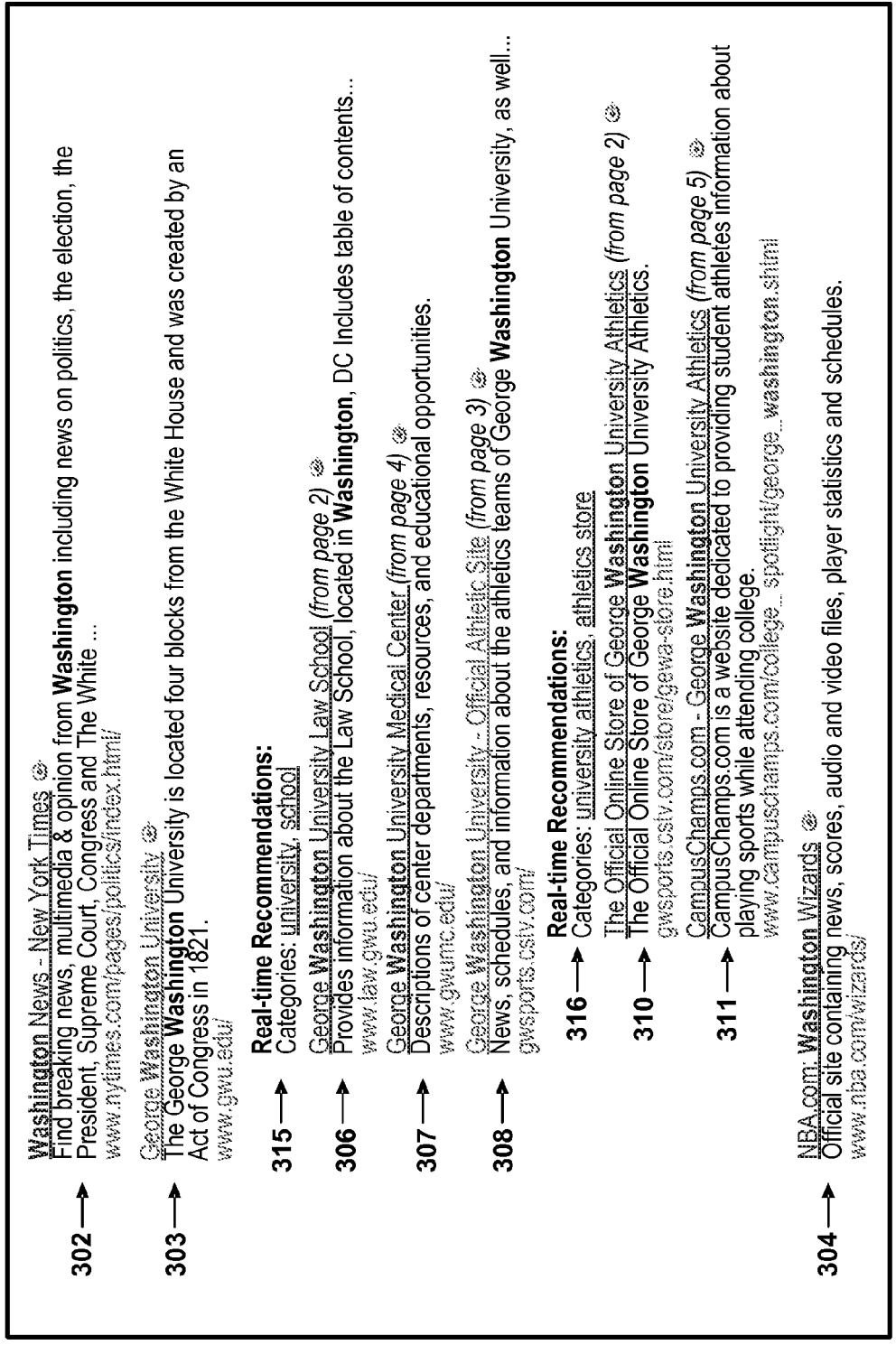
FIG. 3 is a diagram of one embodiment of adaptive UI tools added to the search results page.

FIG. 3 depicts how the invention may add an element to each document in order to provide greater control to the user. In one embodiment, small links, icons or other graphical elements, depicted here as a small image of a bull's eye, are associated with each search result. Selecting one of these icons, by virtue of a click for example, will immediately invoke the re-ranking engine in order to produce recommendations as if the user had selected the associated result. While the re-ranking engine will not be able to associate a dwell time with the selection of an icon, because the document is not actually selected to be opened, this action will enable the user to express a certain interest in a particular result in order to be immediately presented with appropriate recommendations based on that interest.

The invention may be configured so that recommendations are displayed when the user selects a result, when the user selects an icon associated with a result, or in just one instance but not the other. The invention may also be configured so that recommendations are never displayed and, as such, re-ranked documents only appear on subsequent pages of results. In another embodiment of the invention, selecting the icon will always produce at least one recommended result, regardless of the quality of that recommendation relative to the other documents that are already on the page. Having the icon "force" at least one recommendation will be a positive indication to the user that the adaptive UI is currently functional.

In one embodiment of the invention, if there are already recommendations associated with a particular result, a click on the icon will remove those recommendations and any nested recommendations. Subsequent clicks on the icon will alternately open and close any recommendations and nested recommendations. This functionality will enable users to easily remove unwanted recommendations from the result page and then bring them back should they so desire.

In one embodiment of the invention, with respect to updating the real-time user to model to calculate new ranks for the documents, the re-ranking engine considers the action of selecting an icon as separate from actually selecting the document to be opened. The amount of weight applied to the modifications that are subsequently made to the real-time user model of inferred intent can thus be adjusted. For example, clicking an icon could be considered a weaker indicator of intent when compared to actually selecting the document to be opened and, as such, modifications to the subordinate keyword weights will be scaled down appropriately. Should the user subsequently proceed to click the result in order to view the document, modifications to the subordinate keywords weights may be scaled back up to full strength.

Selecting the icon to remove recommendations can be considered an indication of negative intent and such an action is similarly incorporated into the real-time user model. In one embodiment, recommendations that are removed from the page by virtue of selecting an icon are treated as if they had been "skipped" for purposes of the re-ranking engine. In another embodiment, removing recommendations is a stronger indication of intent than simply skipping a result and, as such, any modifications to the subordinate keyword weights are given additional negative influence.

In one embodiment of the invention, movement indicators are also present next to each recommendation, giving the user an indication of the page or location from where the recommendations were pulled. In the example, the document "George Washington University Law School" 306 was pulled forward "from page 2." This is an indication that the document, now presented as a recommended search result, was initially ranked on page 2 at the time the query was submitted. In another embodiment this movement indicator could be the initial rank of the document, such as "#25". In another embodiment, all of the results on subsequent search results pages also include movement indicators, as they too have had their positions altered from the moment the query was initially submitted.

Clustering and query suggestions are a well-understood practice for search engines and many offer both to their users. There are many ways to produce clusters or query suggestions, but typically they revolve around analyzing the various sub-contexts in the result set to offer possible refinements to the user. For example, looking at the result set for the query "Washington," a search engine might propose the following clusters: University of Washington, Washington State, Washington Capitals, Washington Politics, Washington Government, Washington D.C., etc. It's also possible for clusters to be nested within each other. Some search engines also produce query suggestions by looking at refinements produced by previous users who've entered the same query. For example, should the search engine see that many users who query for "Washington" then proceed to query for "University of Washington," the latter could be offered as a query suggestion to users searching for the former. The location on the search results page where the clusters and query suggestions are presented can vary, although they're typically either at the top or bottom, or off to the side in a vertical side bar.

One embodiment of the present invention exploits the real-time user model of inferred intent to produce a list of more highly targeted clusters or query suggestions. For example, at the moment the user selects "George Washington University" 303 to produce recommendations 306-308, the real-time user model has already inferred that the intent is related to "university." As such, the adaptive UI can suggest real-time clusters 315, such as "university" and "school," while simultaneously eliminating clusters that are not related to the user's information need, such as "monument" or "president." In one embodiment, selecting one of these cluster links will rerun the user's query using the cluster information. For example, clicking "university" will run a new query for "Washington University." In another embodiment, selecting one of these links will simply take the subset of documents from the original result set that belong to that particular cluster. It is a not a requirement for the real-time clusters to appear above the recommendations. In other embodiments of the invention they may appear anywhere on the search results page. In the case of a query reformulation, where the real-time user model is carried over from a previous query, it would make sense to put the real-time clusters either at the top of bottom of the search results page.

In another embodiment of the invention, clusters are calculated using the set of produced documents at the moment the user submits the query. There exists many techniques for calculating such clusters, but each document should consequently belong to one or more clusters. At the moment the user selects a document, the real-time clusters may be a function of real-time user model as well as the clusters to which the document originally belonged. Additional document selections will further enable the adaptive UI to determine the clusters that are most appropriate to the user by observing the frequency with which selected documents appear in each of the calculated clusters. In another embodiment of the invention, the set of available clusters is recalculated using a subset of the documents in the result set. This subset is selected based on the real-time user model. For example, after each user action the set of available clusters could be recalculated using the top 50 re-ranked documents. This technique will enable the clusters to follow the evolution of the real-time user model.

Real-time clusters can be presented to the user every time there is an update to the real-time user model, which typically occurs when the user selects a document or moves to a subsequent page of results. The real-time clusters take advantage of the cumulative nature of the real-time user model. For example, after selecting "George Washington University" 303, should the user continue by selecting "George Washington University—Official Athletic Site" 308, the adaptive UI can present clusters 316 based on both of these actions, such as "university athletics" and "athletics store". Real-time cluster and query suggestion links may also be shown immediately upon displaying a subsequent page of results.

The practical advantage of real-time clusters or query suggestions is that they are targeted to the user's real-time intent. Traditionally clusters and query suggestions have been unable to exploit the information present in a real-time user model of inferred intent and, as such, rely on providing a wide range of clusters related to the entire document set, or alternatively the reformulations from users who previously submitted a similar query. This inevitably requires the user to wade through a considerable number of options, which requires time and energy. Conversely, real-time clusters, by virtue of being based off the real-time user model, are more targeted to the user's intent and are typically fewer in number.

The adaptive UI of the present invention can similarly be used to deliver more highly-targeted advertisements. The selection of advertisements can, however, be somewhat different from the re-ranking of organic results. Search engines will typically display advertisements based on a combination of RPC (revenue per click, which is the amount of money the advertiser is willing to pay for a click on a given sponsored link) and CTR (click-through rate, or the rate at which users selected a given sponsored link). The RPC and CTR together are used to maximize the amount of revenue generated for a given user's query by producing a ranked list of available sponsored links.

In one embodiment of the invention, the real-time user model is used to re-rank sponsored links in the same manner that is used to re-rank organic results. The subordinate keywords are matched with the titles, snippets and URLs of the available sponsored links for a given query, and the order of the sponsored links is changed.

To illustrate how this might work, Table II is a representation of sponsored links returned for a user's query for "digital camera." The RPC represents the amount of money that the advertiser is willing to pay for a click while the CTR represents the rate at which users click the advertisement when it is displayed on the search page. The CTR will most certainly be a function of where the advertisement is displayed in relation to the others, but for purposes of this illustration consider the CTR to be normalized.

TABLE II

Example of sponsored advertisements for the user's query "digital camera" ranked by the search engine as a function of, among other things, RPC and CTR

| Rank | RPC | CTR | Sponsored Advertisement |
|---|---|---|---|
| 1 | $0.50 | 2.0% | Digital Camera<br>Find Brand Name Digital Cameras at Prices you'll Love. Shop Kmart Now!<br>www.Kmart.com |
| 2 | $0.50 | 1.9% | Best Buy ® Official Site<br>5%-16% Off Select Digital Cameras This Week At Best Buy ®. Shop Now!<br>www.BestBuy.com |
| 3 | $0.55 | 1.7% | Sony ® Digital Cameras<br>Official Site: Sony Cyber-shot ®<br>Digital Cameras starting at $129.99<br>www.SonyStyle.com/cybershot |
| 4 | $0.55 | 1.6% | New Digital Camera - TL100<br>Slim Design with Smart Auto.<br>12.2 Megapixels, 2.7" LCD & More<br>www.samsung.com/us/tl100 |
| 5 | $0.45 | 2.0% | Digital Camera<br>Browse New Digital Cameras at Dell.<br>Compare Brands and Megapixels Here!<br>www.Dell.com |
| 6 | $0.40 | 2.1% | Digital Cameras on Sale<br>Free Shipping & No Tax. Authorized Dealer. 24/7 Customer Support!<br>RitzCamera.com |
| 7 | $0.35 | 1.8% | Limited Time Camera Deals<br>Save $100 Instantly on Digital Cameras Only at OfficeMax - Buy Now!<br>www.OfficeMax.com |
| 8 | $0.35 | 1.6% | Digital Cameras $9.95<br>Sale - Bargain - All Brands<br>Quantity Discounts - Free Ship<br>www.EcaMeraFilms.com |
| 9 | $0.30 | 1.8% | Digital Camera<br>Compare Price and Features.<br>Large Selection In Stock Today.<br>www.Staples.com |
| 10 | $0.25 | 1.7% | Digital Camera Bargains<br>Save on Every SLR, Standard Point & Shoot and Compact Digital Camera.<br>www.NexTag.com/Digital-Cameras |

As can be seen, the advertisements are produced in a certain order which can be a function of many different things, but typically will rely heavily on RPC and CTR. This is because the objective of the search engine is to put the advertisements in an order that will generate the greatest amount of revenue, which is a function of how often an advertisement is clicked multiplied by the amount of revenue generated by each click. That is why advertisements with higher RPCs will sometimes be ranked beneath those with lower RPCs. For example, in Table II the advertisement for "Sony® Digital Cameras" is ranked below the advertisement for "Best Buy® Official Site" even though it has a higher RPC. This is because the CTR for the "Sony® Digital Cameras" is lower, meaning that in aggregate it'll generate less revenue for that query.

How these advertisements are displayed is then up to the search engine. In many cases they'll be displayed in a column, in descending order, to the right-hand side of the organic results. Typically only a maximum number of advertisements will be displayed, depending, among other things, on the user's query. In some instances the search engine will decide to take a number of the top advertisements and display them either above or below the organic results. Additionally, there are search engines that will mix the advertisements in with the organic results. In most cases, however, the search engine will indicate which results are sponsored by either putting them in a colored box or indication as such with text.

Should a real-time model of the user's intent be available, which is the case when a user has already taken an action during the current information session, then the adaptive UI can exploit this to produce a superior ranking of advertisements. The real-time model of user intent can come from clicks on either organic or sponsored links during the current query or previous queries in the same information session.

Continuing with the current illustration, assume that the real-time user model contains the following subordinate keywords with significant positive weights: sale, save, discount and bargain. Assume as well that the real-time user model also contains the following subordinate keywords with significant negative weights: song and new. As described above, these subordinate keywords may have been produced by virtue of the user selecting documents or advertisements related to "digital camera sales" while skipping results related to "new digital cameras by Sony."

Table III represents how the order of the ads might be changed based on the real-time user model. The ranks of advertisements related to the positive subordinate keywords are improved while the ranks of those ads related to the negative subordinate keywords are reduced. The objective here is still to maximize revenue for the search engine, however, while RPC and CTR information can be taken into account, advertisements that might otherwise have be ranked low are brought forward because they are more closely aligned with the user's real-time information need as indicated by the real-time user model of inferred intent.

TABLE III

Example of sponsored advertisements for the user's query "digital camera" re-ranked by the real-time user model - for ease of understanding, positive subordinate keywords are represented in bold while negative subordinate keywords are in italic

| New Rank | Old Rank | RPC | CTR | Sponsored Advertisement |
|---|---|---|---|---|
| 1 | 6 | $0.40 | 2.1% | Digital Cameras on Sale Free Shipping & No Tax. Authorized Dealer. 24/7 Customer Support! RitzCamera.com |
| 2 | 8 | $0.35 | 1.6% | Digital Cameras $9.95 Sale - Bargain - All Brands Quantity Discounts - Free Ship www.EcaMeraFilms.com |
| 3 | 7 | $0.35 | 1.8% | Limited Time Camera Deals Save $100 Instantly on Digital Cameras Only at OfficeMax - Buy Now! www.OfficeMax.com |
| 4 | 1 | $0.50 | 2.0% | Digital Camera Find Brand Name Digital Cameras at Prices you'll Love. Shop Kmart Now! www.Kmart.com |
| 5 | 10 | $0.25 | 1.7% | Digital Camera Bargains Save on Every SLR, Standard |

TABLE III-continued

Example of sponsored advertisements for the user's query "digital camera" re-ranked by the real-time user model - for ease of understanding, positive subordinate keywords are represented in bold while negative subordinate keywords are in italic

| New Rank | Old Rank | RPC | CTR | Sponsored Advertisement |
|---|---|---|---|---|
| | | | | Point & Shoot and Compact Digital Camera. www.NexTag.com/Digital - Cameras |
| 6 | 2 | $0.50 | 1.9% | Best Buy ® Official Site 5%-16% Off Select Digital Cameras This Week At Best Buy ®. Shop Now! www.BestBuy.com |
| 7 | 5 | $0.45 | 2.0% | Digital Camera Browse *New* Digital Cameras at Dell. Compare Brands and Megapixels Here! www.Dell.com |
| 8 | 3 | $0.55 | 1.7% | *Sony* ® Digital Cameras Official Site: *Sony* Cyber-shot ® Digital Cameras starting at $129.99 www.*Sony*Style.com/cybershot |
| 9 | 4 | $0.55 | 1.6% | *New* Digital Camera - TL100 Slim Design with Smart Auto. 12.2 Megapixels, 2.7" LCD & More www.samsung.com/us/tl100 |
| 10 | 9 | $0.30 | 1.8% | Digital Camera Compare Price and Features. Large Selection In Stock Today. www.Staples.com |

In another embodiment of the invention, highly weighted subordinate keywords or real-time clusters from the real-time user model are used to enhance the user's query in order to identify additional potentially relevant sponsored links. This is particularly useful when the set of sponsored advertisements for a given query is small, or when the user's real-time intent, as described by the real-time user model, varies considerably from the original query.

To illustrate this point, consider a real-time user model where the term "bargain" has a significantly high positive weight, or where "bargain" represents a real-time cluster of significant weight. Table IV is then an example of sponsored advertisements associated with the user query "digital camera bargain." These sponsored advertisements are ranked by the search engine in a manner similar to the sponsored advertisements in Table II.

TABLE IV

Example of sponsored advertisements for the user's query "digital camera bargain" ranked by the search engine as a function of, among other things, RPC and CTR

| Rank | RPC | CTR | Sponsored Advertisement |
|---|---|---|---|
| 1 | $0.75 | 2.2% | Digital Camera Bargain We Have 800+ Digital Cameras. Digital Camera Bargain on Sale! www.NexTag.com/Digital-Cameras |
| 2 | $0.50 | 1.8% | Affordable Cameras Find A Wide Selection Of Affordable Cameras At Best Buy ®. Shop Now! www.bestbuy.com |
| 3 | $0.45 | 1.7% | Digital Cameras Cheap Browse for Point & Shoot Digital Cameras from our Secured Merchants. Become.com |
| 4 | $0.30 | 1.6% | Save on Digital Cameras Low Low Prices on Brand Names |

TABLE IV-continued

Example of sponsored advertisements for the
user's query "digital camera bargain" ranked by
the search engine as a function of, among other things, RPC and CTR

| Rank | RPC | CTR | Sponsored Advertisement |
|---|---|---|---|
| 5 | $0.25 | 2.0% | Same Day Shipping, Buy Now! www.TigerDirect.com Digital Camera Store Canon, Nikon, Sony, Olympus & More! Authorized Dealer - Paypal Accepted www.JR.com/Digital_Cameras |

The adaptive UI of the present invention may subsequently enhance the list of sponsored advertisements from Table II by methodically inserting those from Table IV. The challenge is that while there is a ranking of advertisements for the user's query "digital camera" and another ranking of advertisements for the user's query "digital camera bargain," there is no combined ranking of the two sets of advertisements.

In one embodiment of the invention, the two lists are combined as a function of RPC and CTR and then re-ranked using the real-time user model. For the example, first the advertisements of Table IV are added to the advertisements of Table II similar to if all of the advertisements had been related to the initial user query. Then the real-time user model is used to re-rank the advertisements in the same manner as Table III. Table V is a representation of the re-ranked ads from Tables II and IV. In can be noted that in this particular example that the top advertisement, "Digital Camera Bargain," wasn't even present in the set of advertisements for the user's original query.

Example of sponsored advertisements for the user's query
"digital camera" re-ranked and then
enhanced by sponsored advertisements
from a user's query for "digital camera bargain"

| New Rank | Old Rank | RPC | CTR | Sponsored Advertisement |
|---|---|---|---|---|
| 1 | Table IV - 1 | $0.75 | 2.2% | Digital Camera Bargain We Have 800+ Digital Cameras. Digital Camera Bargain on Sale! www.NexTag.com/Digital-Cameras |
| 2 | Table II - 6 | $0.40 | 2.1% | Digital Cameras on Sale Free Shipping & No Tax. Authorized Dealer. 24/7 Customer Support! RitzCamera.com |
| 3 | Table IV - 2 | $0.50 | 1.8% | Affordable Cameras Find A Wide Selection Of Affordable Cameras At Best Buy ®. Shop Now! www.bestbuy.com |
| 4 | Table IV - 4 | $0.30 | 1.6% | Save on Digital Cameras Low Low Prices on Brand Names Same Day Shipping, Buy Now! www.TigerDirect.com |
| 5 | Table II - 8 | $0.35 | 1.6% | Digital Cameras $9.95 Sale - Bargain - All Brands Quantity Discounts - Free Ship www.EcaMeraFilms.com |
| 6 | Table II - 7 | $0.35 | 1.8% | Limited Time Camera Deals Save $100 Instantly on Digital Cameras Only at OfficeMax - Buy Now! www.OfficeMax.com |
| 7 | Table IV - 3 | $0.45 | 1.7% | Digital Cameras Cheap Browse for Point & Shoot Digital Cameras from our Secured Merchants. Become.com |
| 8 | Table II - 1 | $0.50 | 2.0% | Digital Camera Find Brand Name Digital Camerasat Prices you'll Love. Shop Kmart Now! www.Kmart.com |
| 9 | Table II - 10 | $0.25 | 1.7% | Digital Camera Bargains Save on Every SLR, Standard Point & Shoot and Compact Digital Camera. www.NexTag.com/Digital-Cameras |
| 10 | Table II - 2 | $0.50 | 1.9% | Best Buy ® Official Site 5%-16% Off Select Digital Cameras This Week At Best Buy ®. Shop Now! www.BestBuy.com |

In the most commonly used search engines, the sponsored links are separate from the organic results. They are typically displayed in a column to the right of the organic results. However, the most attractive ads can be placed either above or below the organic results. In one embodiment of the invention, as soon as a new ranking of advertisements is available, the old set is removed and simply replaced with the new set. While simple to implement from a UI perspective, the disadvantage of this method is that the old advertisement are no longer available to the user, which could cause frustration.

In another embodiment, the adaptive UI makes the advertisements operate in a similar fashion to the organic results. When either an organic or sponsored result is selected, recommended sponsored links are immediately presented on the search results page, however, the old advertisement are not removed. The recommended sponsored links may be presented either above or below the original sponsored links, or inserted into the list of sponsored links in a fashion similar to the insertion of recommended organic results into the list of organic search documents.

When a subsequent page of results is produced, however, there is an opportunity to display an entirely new set of advertisements based on the real-time user model. In one embodiment of the invention, at the moment the user selects "next" or "more results," the real-time user model is updated, the sponsored links are immediately re-ranked and selected as described above, and then the top recommended sponsored links are displayed on the new page of results in a fashion similar to the display of the original sponsored links on the first page of search results.

In another embodiment of the invention, during a query reformulation that is part of the same information session, the adaptive UI uses the real-time user model to produce a re-ranked set of sponsored links at the moment the new query is submitted. For example, should the user's first query be "digital camera" and the reformulation be "digital camera slr," then once it is determined that both of these queries belong to the same information session, the real-time user model is carried over to the new query and can used to select new advertisements. Should "canon" have been a highly weighted subordinate keyword, re-ranked advertisements for "canon digital slr cameras" might be selected to appear on the search results page.

In search engines where the sponsored results are mixed in with the organic results, the adaptive UI may simply re-rank the combined result set, as described above, as if all the results were organic. In this scenario, in order to maximize the revenue generated from the query, preference may be given to the sponsored results during the re-ranking process.

The outcome is an adaptive UI for a search engine that harnesses the power of a real-time user model to continuously change, update and reorganize search results and sponsored links based upon the "at the moment" intent of the user as deduced from the ongoing behavior of the user during the search process.

The user's browser may be installed on other devices than a computer, such as a personal digital assistant (PDA), a mobile phone, TV, or any other device. The display can be modified to fit a smaller form factor.

As will be understood by those of skill in the art, the present invention could be embodied in other specific forms without departing from the essential characteristics thereof. The present invention can use a separate third party search engine, or could be integrated with a search engine. The search engine could be a general search engine that searches the internet, a specialized search engine that searches a particular web site, a database search engine, a meta-search engine that combines the results of multiple other search engines, or any other type of search engine. Accordingly the foregoing description is intended to be illustrative, but not limiting, of the scope of the invention which is set forth in the following claims.

What is claimed is:

1. A method for dynamically modifying search results comprising:
    receiving one or more keywords for use as search terms from a user;
    providing a first set of search result objects;
    monitoring which document said user clicks on in interacting with said first set of search result objects;
    compiling information to infer user intent based on said clicked documents;
    upon said user clicking to return from said document to said set of search result objects including said document, immediately automatically re-ranking said first set of search result objects based on said inferred user intent, so that a user clicking on a single document from said first set of search result objects results in a re-ranking of said first set of search result objects, so that upon said user returning from said document to said first set of search result objects including sad document the re-ranked results will be visible;
    doing said re-ranking in a same browser session and on the existing search results page, without the user having to reload said search results page; and
    moving forward a number of documents as a function of the quality of the documents being moved forward compared to documents already displayed to said user, wherein the function of quality comprises a determination of which documents are more relevant to said user's inferred intent than documents already displayed;
    compiling said re-ranked first set of search result objects; and
    displaying to said user the re-ranked documents.

2. The method of claim 1 wherein said subsequent search result objects are a subsequent page of search result objects.

3. The method of claim 1 further comprising:
    monitoring which documents said user skips;
    compiling information to infer user intent based on the content of said clicked and said skipped documents; and
    compiling further information to infer user intent based on the content of said document the user clicks on and said documents said user skips.

4. A method for dynamically modifying search results comprising:
    receiving one or more keywords for use as search terms from a user;
    providing a first set of search result objects;
    monitoring which document said user clicks on in interacting with said first set of search result objects;
    compiling information to infer user intent based on said clicked documents;
    upon said user clicking to return from said document to said set of search result objects including said document, immediately automatically re-ranking said first set of search result objects based, on said inferred user intent, so that a user clicking on a single document from said first set of search result objects results in a re-ranking of said first set of search result objects, so that upon said user returning from said document to said first set of search result objects including said document the re-ranked results will be visible;
    doing said re-ranking in a same browser session and on the existing search results page, without the user having the reload said search results page; and
    moving forward a number of documents based on a plurality of possible inferences of user intent;
    where said compiling of information determines that there are multiple possible sub-contexts for the user's intent, represented as subordinate keywords with significant positive weights, and further comprising displaying to said user the to re-ranked document from each of said sub-contexts based on different combinations of said subordinate keywords.

5. A method for dynamically modifying search results comprising:
    receiving one or more keywords for use as search terms from a user;
    providing a first set of search result objects;
    monitoring which document said user clicks on in interacting with said first set of search result objects;
    compiling information to infer user intent based said clicked documents;
    upon said user clicking to return from said document to said set of search result objects including said document, immediately automatically re-ranking said first set of search result objects based on user intent inferred from said analyzing of the content of said document said user clicks on mid said documents said user skips, so that a user clicking on a single document from said first set of search result objects results in a re-ranking of said first set of search result objects, so that upon said user returning from said document to said first set of search result objects including said document the re-ranked results will be visible;
    doing, said re-ranking based on information from searches including said keywords in a same browser session;
    placing icons next to said search result objects; and
    upon selection of an icon by a particular search result object, re-ranking said search result objects by producing a plurality of recommended documents corresponding to user intent inferred from said particular document;
    compiling said re-ranked first set of search result objects; and
    displaying to said user the re-ranked documents.

6. A method for dynamically modifying search results comprising:
    receiving one or more keywords for use as search terms from a user;
    providing a first set of search result objects;

monitoring which document said user clicks on in interacting with said first set of search result objects;
compiling information to infer user intent based on said clicked documents;
upon said user clicking to return from said document to said set of search result objects including said document, immediately automatically re-ranking said first set of search result objects based on said inferred user intent, so that a user clicking on a single document from said first set of search result objects results in a re-ranking of said first set of search result objects, so that upon said user returning from said document to said first set of search result objects including said document the re-ranked results will be visible;
doing said re-ranking based on information from searches including said keywords in a same browser session;
compiling said re-ranked first set of search result objects;
displaying to said user the re-ranked documents; and
displaying to clusters of key word recommendations based on said inferred user intent from said clicked documents in real time.

7. The method of claim 6 further comprising displaying the clusters above a set of newly displayed results from said re-ranking.

8. A method for dynamically modifying advertisements associated with search results comprising:
receiving one or more keywords for use as search terms from a user;
providing a first set of search result objects;
providing a first set of advertisement objects related to said first set of search result objects;
monitoring which of said objects, search results and advertisements, is selected by said user; compiling information to infer user intent based on said document the user clicks on;
automatically re-ranking said first set of search result objects based on said inferred user intent;
compiling said re-ranked first set of search result objects;
displaying to said user the re-ranked documents;
upon said user clicking to return from said object to said set of search result objects including said object, immediately automatically inserting into said first set of objects advertisement objects based on said inferred user intent, so that a user clicking on a single object from said first set of objects results in new advertisement objects, so that upon said user returning from said document to said first set of search result objects including said object the new advertisement objects will be visible;
doing said insertion based on determining subordinate keywords based on user clicking actions;
weighting said subordinate keywords in accordance with an inferred likelihood of user interest;
displaying ads based on the most highly weighted of said subordinate keywords.

9. The method of claim 8 further comprising re-ranking said ads based on further user action in combination with the revenue per click and click through rate of said ads.

10. The method of claim 9 wherein said re-ranking sad ads comprises replacing ads with more targeted ads.

11. The method of claim 8 further comprising:
monitoring which of said objects, search results and advertisements, are skipped by said user; and
compiling information to infer user intent based on the content of said documents the user clicks on and skips.

12. A method for dynamically modifying search results comprising:
receiving one or more keywords for use as search terms from a user;
providing a first set of search result objects corresponding to documents;
providing a first display of search results object to said user;
monitoring which document said user clicks on in interacting with said first set of search result object;
compiling information to infer user intent based said clicked documents;
upon said user clicking to return from said document to said set of search result objects including said document, immediately automatically re-ranking said first set of search result objects based on said inferred user intent, so that a user clicking on a single document from said first set of search result objects results in a re-ranking of said first set of search result objects, so that upon said user returning from said document to said first set of search result objects including said document the re-ranked results will be visible;
doing said re-ranking in a same browser session and on the existing search results page, without the user having to reload said search results page; and
based on said inferred user intent, re-ranking subsequent search result objects beyond said first display, before said user views said subsequent search result objects;
compiling said re-ranked first set of search result objects; and
displaying to said user the re-ranked documents.

13. The method of claim 12 further comprising:
monitoring which objects said user skips; and
compiling information to infer user intent based on the content of any documents the user clicks on and said documents said user skips.

\* \* \* \* \*